United States Patent
Hassani et al.

(10) Patent No.: US 11,912,234 B2
(45) Date of Patent: Feb. 27, 2024

(54) ENHANCED BIOMETRIC AUTHORIZATION

(71) Applicant: Ford Global Technologies, LLC, Dearborn, MI (US)

(72) Inventors: Ali Hassani, Ann Arbor, MI (US); Mackenzie Martinez, Commerce Township, MI (US); John Robert Van Wiemeersch, Novi, MI (US); Jake Schwartz, Dearborn, MI (US); Medha Karkare, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 17/540,394

(22) Filed: Dec. 2, 2021

(65) Prior Publication Data

US 2023/0174017 A1 Jun. 8, 2023

(51) Int. Cl.
  *B60R 25/25* (2013.01)
  *G07C 9/00* (2020.01)
(52) U.S. Cl.
  CPC .......... *B60R 25/25* (2013.01); *G07C 9/00563* (2013.01)
(58) Field of Classification Search
  CPC .................... B60R 25/25; G07C 9/00563
  See application file for complete search history.

(56) References Cited

U.S. PATENT DOCUMENTS

| | | | |
|---|---|---|---|
| 6,100,811 A | 8/2000 | Hsu et al. | |
| 8,296,573 B2 | 10/2012 | Bolle et al. | |
| 9,071,602 B2 | 6/2015 | Kamakura | |
| 9,239,945 B2 | 1/2016 | Hama | |
| 9,461,992 B2 | 10/2016 | Outwater et al. | |
| 9,576,121 B2 | 2/2017 | Cao | |
| 9,688,225 B2 | 6/2017 | Byrne et al. | |
| 10,164,973 B1 | 12/2018 | Prasad et al. | |
| 10,248,771 B1 * | 4/2019 | Ziraknejad | H04L 63/0861 |
| 10,414,377 B2 | 9/2019 | Hoyos et al. | |
| 10,464,530 B2 * | 11/2019 | Falkson | B60R 25/257 |
| 10,742,410 B2 * | 8/2020 | Gehrmann | G06F 21/32 |
| 10,902,237 B1 | 1/2021 | Aggarwal et al. | |
| 10,970,516 B2 * | 4/2021 | Schwartz | G06V 40/1365 |
| 11,017,203 B1 | 5/2021 | Aggarwal et al. | |
| 2006/0294393 A1 | 12/2006 | McCall | |

(Continued)

FOREIGN PATENT DOCUMENTS

WO 2021094774 A1 5/2021

OTHER PUBLICATIONS

Non-Final Office Action for U.S. Appl. No. 17/540,432, filed Dec. 2, 2021, as issued by the USPTO Nov. 24, 2023.

(Continued)

*Primary Examiner* — Thomas D Alunkal
(74) *Attorney, Agent, or Firm* — Frank Lollo; Bejin Bieneman PLC

(57) ABSTRACT

Upon authorizing a user via challenge biometric data, user data is determined to be updated based on detecting a trigger. Upon detecting the trigger prior to authenticating the user, the user data is updated with the challenge biometric data based on authenticating the user. Upon detecting the trigger after authenticating the user, the user data is updated with updated challenge biometric data based on a confidence score for the second biometric data exceeding a threshold. Structure components are controlled based on the updated user data.

20 Claims, 5 Drawing Sheets

(56) References Cited

U.S. PATENT DOCUMENTS

| | | |
|---|---|---|
| 2015/0286811 A1 | 10/2015 | Phan et al. |
| 2016/0065666 A1* | 3/2016 | Kim ..................... H04L 67/303 709/203 |
| 2017/0063850 A1* | 3/2017 | Cartaya ............... H04L 63/0861 |
| 2017/0132408 A1 | 5/2017 | Kim et al. |
| 2018/0272945 A1 | 9/2018 | Worthen et al. |
| 2018/0365402 A1 | 12/2018 | Ko et al. |
| 2019/0005217 A1 | 1/2019 | Kim et al. |
| 2019/0362333 A1 | 11/2019 | Agarwal |
| 2020/0082062 A1 | 3/2020 | Mequanint et al. |
| 2020/0311509 A1 | 10/2020 | Benkley, III et al. |
| 2020/0320181 A1 | 10/2020 | Deutschmann et al. |
| 2021/0053530 A1 | 2/2021 | Bohl et al. |
| 2021/0182373 A1 | 6/2021 | Tussy |
| 2021/0309181 A1 | 10/2021 | Kale et al. |
| 2022/0019646 A1 | 1/2022 | Bielby et al. |
| 2022/0108701 A1 | 4/2022 | Gupya et al. |
| 2022/0219643 A1* | 7/2022 | Hanson ................ G06V 40/172 |
| 2022/0253514 A1 | 8/2022 | Ackerman et al. |
| 2022/0300593 A1* | 9/2022 | Brownlee .......... G06V 40/1353 |
| 2023/0145344 A1 | 5/2023 | Okuyama |
| 2023/0162695 A1 | 5/2023 | Chau et al. |

OTHER PUBLICATIONS

Non-Final Office Action for U.S. Appl. No. 17/540,321, filed Dec. 2, 2021, as issued by the USPTO Dec. 13, 2023.
Non-Final Office Action for U.S. Appl. No. 17/540,408, filed Dec. 2, 2021, as issued by the USPTO Jan. 4, 2024.

* cited by examiner

ENHANCED BIOMETRIC AUTHORIZATION

BACKGROUND

A computer performing biometric authorization can receive sensor data to determine an identity of a person seeking authorization for access to be granted by the computer. Biometric authorization can include, for example, facial recognition, a type of biometric authorization where an image of a human face is used to identify a person. Biometric authorization can rely upon acquiring accurate biometric data.

DETAILED DESCRIPTION

Figure 1:
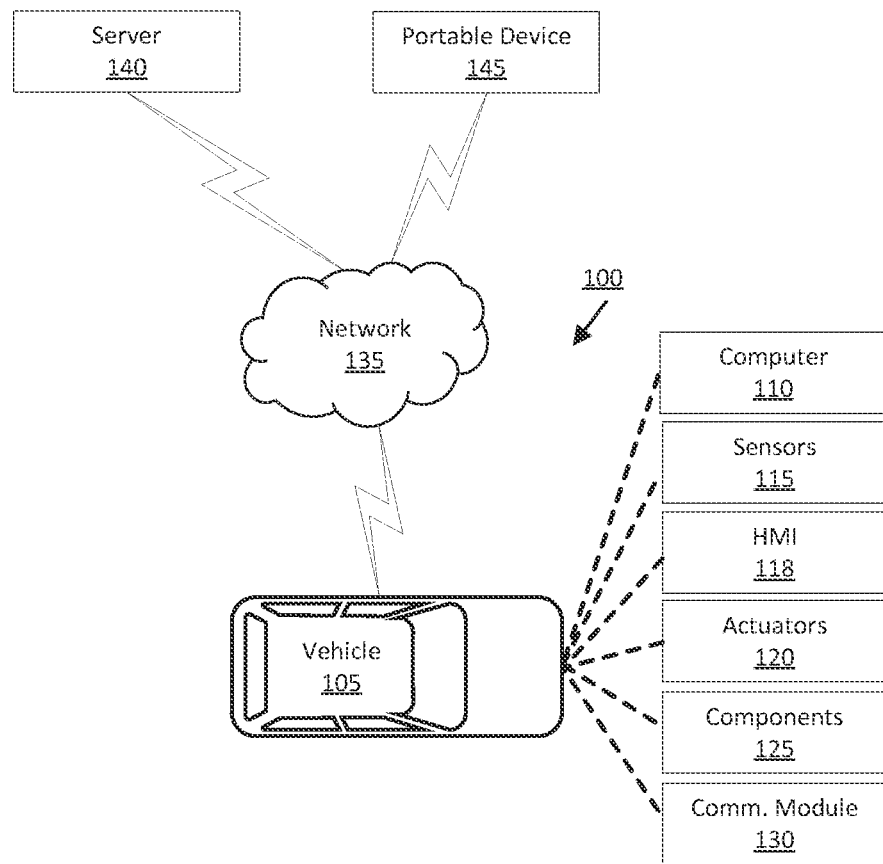
FIG. 1 is a block diagram illustrating an example control system for a vehicle.

Biometric authorization can be used by a computer to control access to devices, objects, and/or applications, e.g., to vehicles, buildings, computers, cell phones, other devices, etc. For example, biometric authorization can be implemented to permit authorized people to access, e.g., to a vehicle or building, and to deny access to unauthorized people. Biometric authorization may require that a user provide one or more types of biometric data and/or to provide the biometric data in a specific manner, e.g., in a specified sequence, to a specified sensor, etc., to generate user data that can be used to determine authorization. Biometric data is data representing measurements of physiological characteristics. A type of biometric data is data representing a specific physiological characteristic, e.g., distances between ridges in a fingerprint, distances between facial features, etc. Biometric authorization can authorize users by comparing the biometric data provided by the user to biometric data subsequently obtained via sensors in the vehicle, building, computing device, etc.

The results of performing the biometric authorization can be downloaded to a device granting or denying authorization and permission to access a structure, for example, a vehicle, a building, a room, a gated area, etc. Successful authorization can be used for security applications such as access to a location, e.g., a passenger cabin of a vehicle, a room, a building, etc., by unlocking a door. In other examples, successful authorization can be used to enable vehicle or building controls, or yet further alternatively or additionally access to a device such as a computer by enabling input devices like a keyboard or mouse, or granting access to computer files.

Authorizing users for vehicles will be described herein as a non-limiting example of biometric authorization. That is, a vehicle will be described herein as a non-limiting example of a structure. It is to be understood that other types of structure, e.g., a building, a garage, a gated area, etc., could utilize techniques described herein for biometric authorization.

Vehicles can be equipped with computing devices, networks, sensors, and controllers to acquire and/or process data regarding the environment and to permit access to the vehicle based on the data. For example, a camera in a vehicle can be programmed to acquire an image of an approaching user and, upon determining the identity of the user based on biometric authorization, e.g., via facial recognition software, unlock a door to permit the user to enter a passenger cabin of the vehicle. Likewise, cameras included in the passenger cabin of the vehicle can acquire one or more images of a user and, upon determining the identity of the user based on biometric authorization, e.g., via facial recognition software, accept commands from the user to operate the vehicle.

However, biometric data for the user can change over time, e.g., due to weight gain or loss, age, hair growth or loss, etc., which can reduce the accuracy of biometric authorization for the user. Advantageously, the vehicle computer can determine whether a trigger occurs after biometrically authorizing a user based on challenge biometric data, i.e., biometric data obtained from a user in real-time or near real-time to compare to stored biometric data to perform biometric authorization for the user. The trigger indicates that user data for the user should be updated with updated biometric data for the user. Based on determining the trigger occurred prior to authenticating the user, the vehicle computer can update the user data to include the challenge biometric data upon authenticating the user. Based on authenticating the user prior to determining the trigger occurred, the vehicle computer can update the user data to include updated challenge biometric data upon determining the trigger occurred. Updating the user data with challenge biometric data in response to determining the trigger occurred allows the vehicle computer to, without input from the user, maintain user data that corresponds to current user biometric data, which can reduce the likelihood that an authorized user will fail biometric authorization, or an unauthorized user will pass biometric authorization.

A system includes a computer including a processor and a memory, the memory storing instructions executable by the processor to, upon authorizing a user via challenge biometric data, determine to update user data based on determining a trigger. The instructions further include instructions to, upon determining the trigger prior to authenticating the user, update the user data with the challenge biometric data based on authenticating the user. The instructions further include instructions to, upon determining the trigger after authenticating the user, update the user data with updated challenge biometric data based on a confidence score for the updated challenge biometric data exceeding a threshold. The instructions further include instructions to control structure components based on the updated user data.

The trigger can include one or more of expiration of a timer, a confidence score for the challenge biometric data being less than a second confidence threshold, or a presence of a variable characteristic for the user.

The instructions can further include instructions to, based on a confidence score for the challenge biometric data exceeding the threshold, store the challenge biometric data in a buffer upon detecting the trigger. The instructions can further include instructions to, upon updating the user data with the challenge biometric data, delete the challenge biometric data from the buffer.

The instructions can further include instructions to delete the challenge biometric data from the buffer based on not authenticating the user within a predetermined time of storing the challenge biometric data in the buffer.

The instructions can further include instructions to, based on determining to not update the user data, prevent storage of the challenge biometric data in the buffer.

The instructions can further include instructions to, based on the confidence score for the challenge biometric data not exceeding the threshold, prevent storage of the challenge biometric data in the buffer.

The instructions can further include instructions to encrypt the challenge biometric data prior to storing the challenge biometric data in the buffer.

The instructions can further include instructions to, upon determining to update the user data based on the challenge biometric data, retrieve the encrypted challenge biometric data from the buffer. The instructions can further include instructions to decrypt the challenge biometric data prior to updating the user data.

The instructions can further include instructions to authorize the user based on determining that a confidence score for the challenge biometric data is greater than the threshold.

The instructions can further include instructions to authenticate the user based on determining that the confidence score for the challenge biometric data is greater than a second confidence threshold. The second confidence threshold can be greater than the threshold.

The instructions can further include instructions to authenticate the user based on secondary challenge biometric data, the secondary challenge biometric data being a different type of biometric data than the challenge biometric data.

The instructions can further include instructions to authenticate based on a user input.

The instructions can further include instructions to authenticate based on detecting an authorized device.

The instructions can further include instructions to update the user data based additionally on a user input.

The instructions can further include instructions to, based on a confidence score for the challenge biometric data not exceeding the threshold, provide instructions for the user to provide updated biometric data. The instructions can further include instructions to, upon obtaining the updated biometric data, update the user data with the updated biometric data.

A method includes, upon authorizing a user via challenge biometric data, determining to update user data based on determining a trigger. The method further includes, upon determining the trigger prior to authenticating the user, updating the user data with the challenge biometric data based on authenticating the user. The method further includes, upon determining the trigger after authenticating the user, updating the user data with updated challenge biometric data based on a confidence score for the updated challenge biometric data exceeding a threshold. The method further includes controlling structure components based on the updated user data.

The trigger can include one or more of expiration of a timer, a confidence score for the challenge biometric data being less than a second confidence threshold, or a presence of a variable characteristic for the user.

The method can further include, based on a confidence score for the challenge biometric data exceeding the threshold, storing the first biometric data in a buffer upon detecting the trigger. The method can further include, upon updating the user data with the challenge biometric data, deleting the challenge biometric data from the buffer.

The method can further include deleting the challenge biometric data from the buffer based on not authenticating the user within a predetermined time of storing the challenge biometric data in the buffer.

The method can further include authorizing the user based on determining that a confidence score for the challenge biometric data is greater than the threshold.

Further disclosed herein is a computing device programmed to execute any of the above method steps. Yet further disclosed herein is a computer program product, including a computer readable medium storing instructions executable by a computer processor, to execute an of the above method steps.

Figure 2:
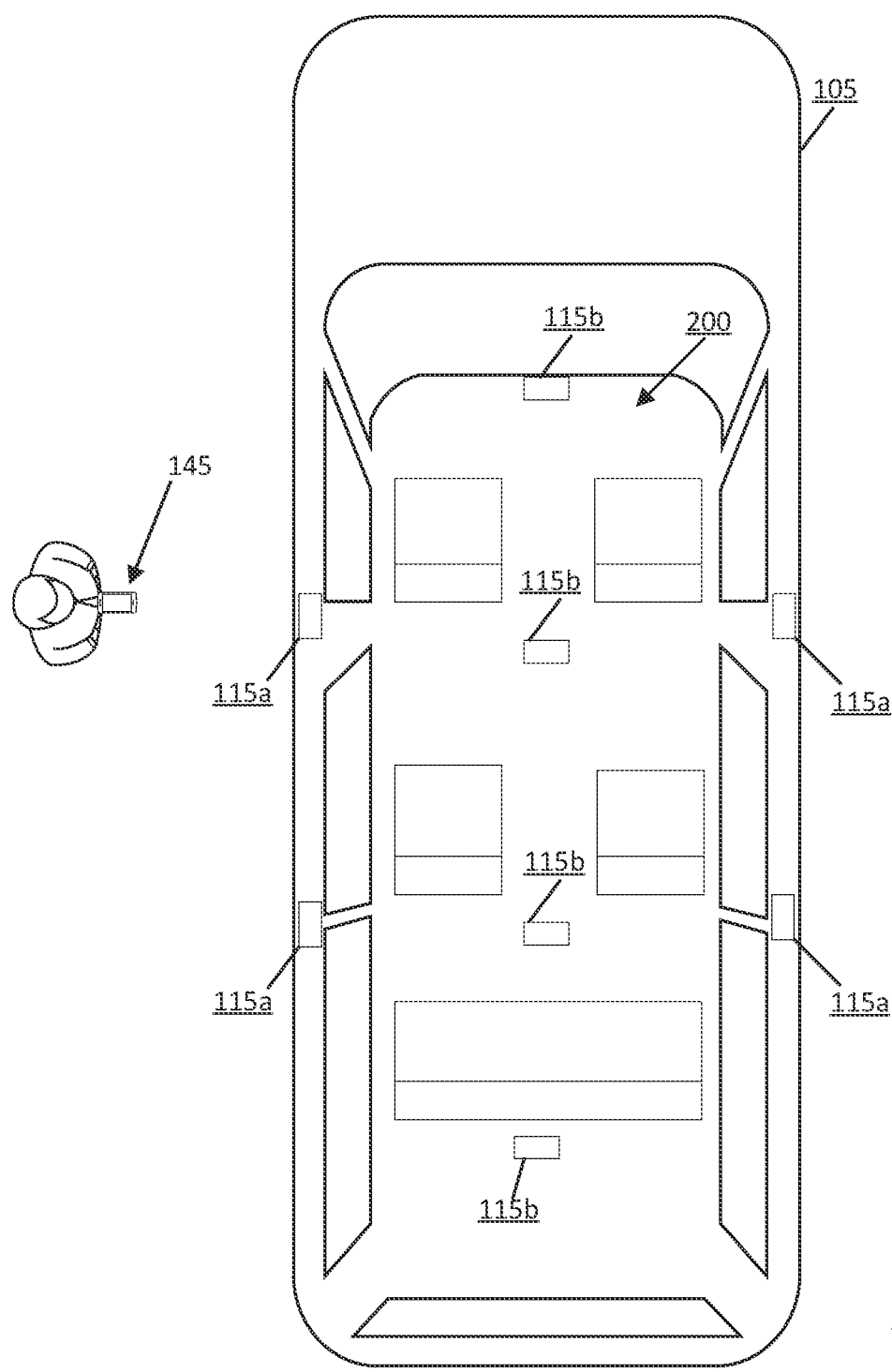
FIG. 2 is a diagram illustrating an exemplary passenger cabin of the vehicle.

With reference to FIGS. 1-2, an example control system 100 includes a vehicle 105. A vehicle computer 110 in the vehicle 105 receives data from sensors 115. The vehicle computer 110 is programmed to, upon authorizing a user via challenge biometric data, determine to update user data based on determining a trigger. The vehicle computer 110 is further programmed to, upon determining the trigger prior to authenticating the user, update the user data with the challenge biometric data based on authenticating the user. The vehicle computer 110 is further programmed to, upon determining the trigger after authenticating the user, update the user data with updated challenge biometric data based on a confidence score for the updated challenge biometric data exceeding a first confidence threshold. The vehicle computer 110 is further programmed to control vehicle components 125 based on the updated user data.

Turning now to FIG. 1, the vehicle 105 includes the vehicle computer 110, sensors 115, actuators 120 to actuate various vehicle components 125, and a vehicle 105 communication module 130. The communication module 130 allows the vehicle computer 110 to communicate with a remote server computer 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor 115 data and/or communicating the sensor 115 data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communication network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, actuators 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor 115(s), etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. As another example, the vehicle 105 can include one or more sensors 115, e.g., camera sensors 115, mounted inside a cabin of the vehicle 105 and oriented to capture images of users in the vehicle 105 cabin. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115, e.g., substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS) and/or dead reckoning. Additionally, or alternatively, the data can include a location of an object, e.g., a vehicle 105, a sign, a tree, etc., relative to the vehicle 105. As one example, the data may be image data of the environment around the vehicle 105. In such an example, the image data may include one or more objects and/or markings, e.g., lane markings, on or along a road. As another example, the data may be image data of the vehicle 105 cabin, e.g., including users and seats in the vehicle 105 cabin. Image data herein means digital image data, i.e., comprising pixels, typically with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle 105 subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI) 118. The HMI 118 includes user input devices such as knobs, buttons, switches, pedals, levers, touchscreens, and/or microphones, etc. The input devices may include sensors 115 to detect a user input and provide user input data to the vehicle computer 110. That is, the vehicle computer 110 may be programmed to receive user input from the HMI 118. The user may provide the user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation, which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communication network and can send and/or receive messages to/from the vehicle computer 110 and other vehicle sub-systems.

In addition, the vehicle computer 110 may be configured for communicating via a vehicle-to-vehicle communication module or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote server computer 140 (typically via direct radio frequency communications). The communication module could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module include cellular, Bluetooth, IEEE 802.11, Ultra-Wideband (UWB), Near Field Communication (NFC), dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 135 include wireless communication networks (e.g., using Bluetooth®, Bluetooth® Low Energy (BLE), UWB, NFC, IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

The portable device 145 can be a conventional computing device, i.e., including one or more processors and one or more memories, programmed to provide operations such as disclosed herein. The portable device 145 can be any one of a variety of computers that can be used while carried by a person, e.g., a smartphone, a tablet, a personal digital assistant, a smart watch, etc. Further, the portable device 145 can be accessed via the network 135, e.g., the Internet, a cellular network, and/or or some other wide area network.

FIG. 2 is a diagram of a top view of an example passenger cabin 200 of an example vehicle 105. The vehicle 105 may include a body (not numbered) defining the passenger cabin 200 to house occupants, if any, of the vehicle. The body includes doors and windows that can be opened, e.g., to allow ingress and egress from the passenger cabin 200.

The passenger cabin 200 may extend across the vehicle 105, i.e., from one side to the other side of the vehicle 105.

The passenger cabin 200 includes a front end (not numbered) and a rear end (not numbered) with the front end being in front of the rear end during forward movement of the vehicle 105. The passenger cabin 200 includes one or more seats (not numbered). The seats may be arranged in any suitable arrangement. For example, the passenger cabin 200 may include one or more front seats disposed at a front of the passenger cabin 200 and one or more back seats disposed behind the front seats. The passenger cabin 200 may also include third-row seats at the rear of the passenger cabin 200. In FIG. 2, the front seats and back seats are shown to be bucket seats and the third-row seats are shown to be bench seats, but the seats may be other types.

The vehicle 105 may include any suitable number of sensors 115, e.g., one or more. For example, as illustrated in FIG. 2, the vehicle 105 may include a plurality of external sensors 115a that are positioned to monitor an environment around the vehicle 105, and a plurality of internal sensors 115b that are positioned to monitor the passenger cabin 200 of the vehicle 105.

Figure 3:
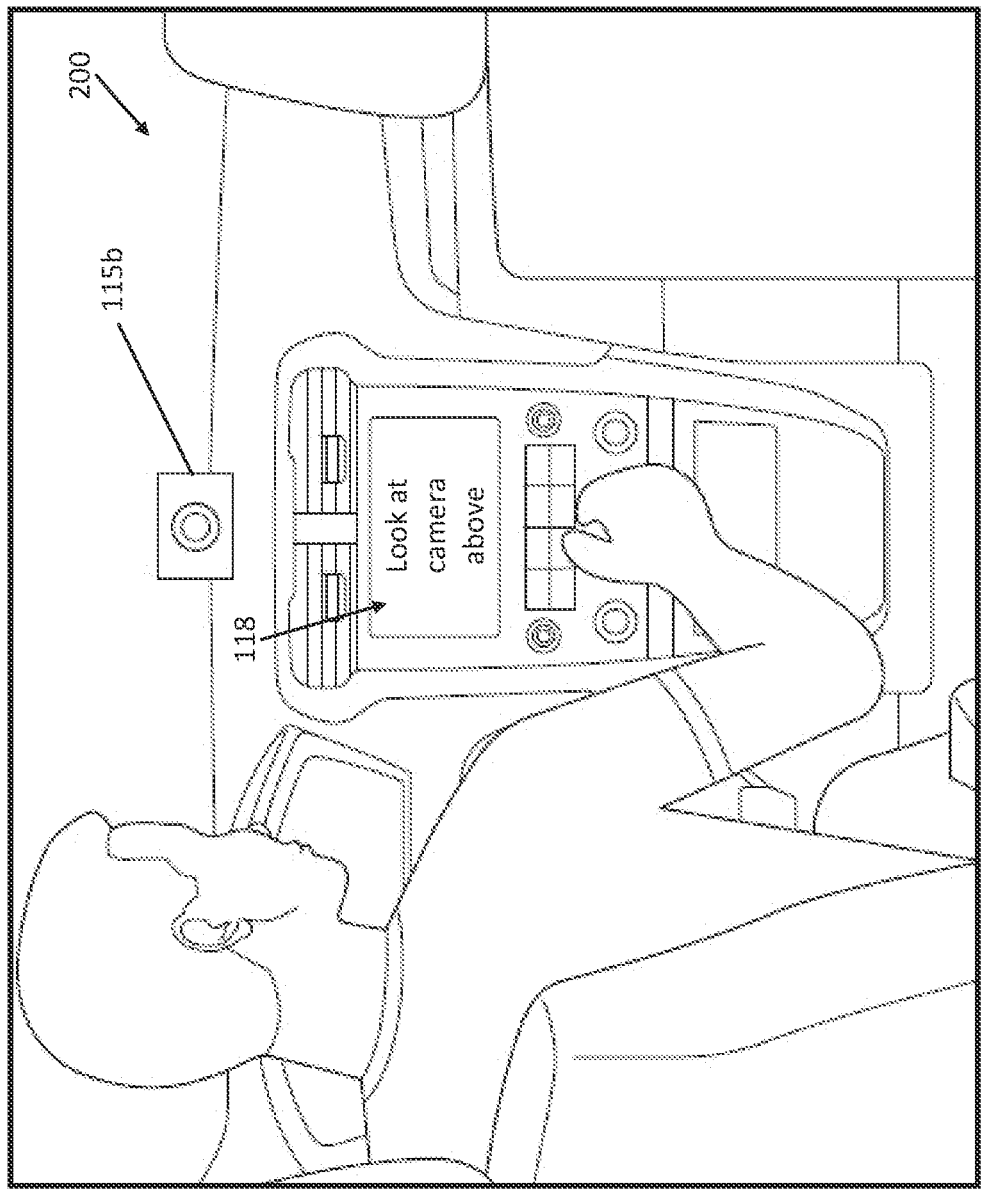
FIG. 3 is a diagram illustrating a user in the exemplary passenger cabin of the vehicle.

The vehicle computer 110 is programmed to determine a user is in the passenger cabin 200 (see FIG. 3). The vehicle computer 110 can, for example, detect the user in the passenger cabin 200 based on data from the internal sensor(s) 115b. For example, the vehicle computer 110 can monitor data from the internal sensor 115b to detect a user has moved into the field of view of the internal sensor 115b. As another example, the vehicle computer 110 can detect the user in the passenger cabin 200 based on receiving a user input via the HMI 118. For example, the vehicle computer 110 can actuate the HMI 118 to display a virtual button that the user can select to indicate that the user is in the passenger cabin 200. In other words, the HMI 118 may activate sensors that can detect the user selecting the virtual button to indicate that the user is in the passenger cabin 200. Upon detecting the user input, the HMI 118 can provide the user input to the vehicle computer 110, and the vehicle computer 110 can determine that the user is in the passenger cabin 200 based on the user input.

As yet another example, the vehicle computer 110 can determine the user is in the passenger cabin 200 based on detecting, in the passenger cabin 200, a portable device 145 associated with the user. For example, the vehicle computer 110 may be programmed to transmit, e.g., via a short-range broadcast protocol, a radio frequency (RF) signal, e.g., BLE, Ultra-Wideband (UWB), etc. The vehicle computer 110 can then detect the portable device 145 based on detecting either the return of the respective transmitted RF signal or a response RF signal transmitted from the portable device 145, e.g., continuously or in response to detecting the RF signal transmitted by the vehicle computer 110. Upon detecting the portable device 145 the vehicle computer 110 can request location data from the portable device 145. The portable device 145 can transmit, e.g., via the network 135, location data, e.g., geo-coordinates, of the portable device 145 to the vehicle computer 110. Upon receiving the location data of the portable device 145, the vehicle computer 110 can compare the location data to a GPS-based geo-fence. A geo-fence herein has the conventional meaning of a boundary for an area defined by sets of geo-coordinates. In such an example, the geo-fence specifies a perimeter of the passenger cabin 200. The vehicle computer 110 can then determine that the user is within the passenger cabin 200 based on the location data of the portable device 145 indicating the portable device 145 is within the geo-fence.

Upon determining that the user is in the passenger cabin 200, the vehicle computer 110 can query the memory to select the user data associated with the user. For example, the vehicle computer 110 can maintain a look-up table or the like, e.g., stored in the memory of the vehicle computer 110, that associates the user with the corresponding biometric data. Upon determining to initiate biometric enrollment (as discussed below), the vehicle computer 110 can update the look-up table to associate the identified user with the first biometric data. The vehicle computer 110 can control vehicle 105 operation based on the user data for the user.

The vehicle computer 110 can store, e.g., in a memory, user data for each of a plurality of potential users. The user data can keep track of authorized users, i.e., users that have permission to access the vehicle 105, and the user data can update over time as biometric data for the user changes, e.g., due to weight gain or loss, age, hair growth or loss, etc. User data includes biometric data for the respective user and a user authorization for the respective user. A user authorization, as used herein, specifies one or more vehicle 105 features that a user has permission to access and/or one or more operating parameters that a user has permission to control.

In the context of this document a "vehicle feature" is a setting of a vehicle component 125 that can be selected by user input, e.g., via the HMI 118. Non-limiting examples of vehicle 105 features include heating and/or cooling seats, climate control, e.g., in multiple zones or areas of the passenger cabin 200, heating a steering wheel, auto-dimming a rearview mirror, heating side mirrors, multi-color lighting, controlling a radio, controlling a moonroof, etc.

In the context of this document an "operating parameter" is an actual value of a measurement of a physical characteristic of a vehicle 105 or an environment around that vehicle 105 during vehicle operation. A variety of operating parameters may be determined during vehicle 105 operation. A non-limiting list of operating parameters includes a speed of the vehicle 105, a following distance between vehicles, a stopping location, an acceleration rate of the vehicle 105, a vehicle 105 destination, a vehicle 105 route, etc.

In an example in which the structure is a building, the user authorization may specify the building, or a room therein, that a user is permitted or prevented from entering. Additionally, or alternatively, the user authorization may specify one or more controls for the building that the user is permitted or prevented from controlling, e.g., light controls, heating controls, cooling controls, speaker controls, etc.

When no user data is associated with the user, the vehicle computer 110 can be programmed to initiate biometric enrollment for the user based on receiving a user input. For example, the vehicle computer 110 can actuate the HMI 118 to display a virtual button that the user can select to initiate biometric enrollment. That is, the HMI 118 can actuate sensors that can detect the user selecting the virtual button. Upon detecting the user input, the HMI 118 can provide the user input to the vehicle computer 110 can the vehicle computer 110 can initiate biometric enrollment. The vehicle computer 110 can provide initial instructions to the user to provide the enrollment biometric data. For example, the vehicle computer 110 can actuate the HMI 118 to output the initial instructions (see FIG. 3). The initial instructions specify actions for the user to perform, e.g., to interact with, such as face and/or touch, a specified sensor, to adjust a user pose relative to a specified sensor, to remove accessories, such as hats, glasses, etc., to speak a word or phrase, etc., to allow the vehicle computer 110 to obtain the enrollment biometric data for the user. Biometric enrollment in this document means generating user data based on obtaining enrollment, i.e., baseline, biometric data for a given user.

When user data is associated with the user, the vehicle computer 110 is programmed to biometrically authorize the user based on challenge biometric data, as discussed below. Challenge biometric data is obtained after the generation of the user data for the user.

During biometric enrollment, the vehicle computer 110 can actuate one or more sensors 115 to obtain enrollment biometric data for the user. For example, the vehicle computer 110 can actuate sensors 115 positioned to face the user. The vehicle computer 110 can actuate various sensors 115 to obtain corresponding types of enrollment biometric data. For example, the vehicle computer 110 can actuate an image sensor 115 to obtain image data including facial characteristics of the user. Additionally, or alternatively, the vehicle computer 110 can actuate a capacitive touch sensor 115 to obtain data including a fingerprint of the user. The vehicle computer 110 can, for example, validate the biometric data by employing known watermarking techniques that encrypt data strings that indicate validity of the biometric data and include the encrypted data strings in the biometric data.

Upon obtaining the enrollment biometric data, the vehicle computer 110 generates user data for the user. For example, the vehicle computer 110 can maintain a look-up table, e.g., stored in the memory of the vehicle computer 110, that associates the user with the corresponding biometric data. Upon determining to initiate biometric enrollment, the vehicle computer 110 can update the look-up table to associate the user with the enrollment biometric data.

Additionally, the vehicle computer 110 can actuate the HMI 118 to display virtual buttons corresponding to various vehicle 105 features and various operating parameters that the user can select to specify the user authorization. In other words, the HMI 118 may activate sensors that detect the user selecting the virtual button(s) to specify the user authorization. Upon detecting the user input, the HMI 118 can provide the user input to the vehicle computer 110, and the vehicle computer 110 can determine the user authorization based on the user input. The vehicle computer 110 can then update the user data to include the determined user authorization. That is, the user data can associate the user authorization with the corresponding user.

Upon generating the user data, the vehicle computer 110 can control the vehicle 105 based on the user data for the user, e.g., the user authorization. For example, the vehicle computer 110 can control vehicle 105 locks to permit the user to access areas of the vehicle 105, e.g., a driver seat, a passenger seat, a rear seat, etc., specified by the user authorization Additionally, the vehicle computer 110 can actuate one or more vehicle components 125 to operate the vehicle 105 to satisfy the operating parameters specified by the user authorization. As another example, the vehicle computer 110 can actuate one or more vehicle components 125 to adjust one or more vehicle 105 features specified by the user authorization.

Additionally, the vehicle computer 110 can actuate the HMI 118 to display a virtual button that the user can select to permit updates to the user data. In other words, the HMI 118 can activate one or more sensors that can detect the user selecting the virtual button to permit updates to the user data. Upon detecting the user input, the HMI 118 can provide the user input to the vehicle computer 110, and the vehicle computer 110 can initiate updates to the user data based on the user input. If the user input permits updates to the user data, the vehicle computer 110 can update the user data based on determining a trigger has occurred (as discussed below). If the user input does not permit updates to the user data, the vehicle computer 110 can maintain the user data, e.g., until the user provides a user input permitting updates to the user data. Maintaining the user data herein means preventing changes to the user data.

In response to the user input permitting updates to the user data, the vehicle computer 110 can update the user data at a future time. The future time is a time after biometric enrollment for the user is completed. At the future time, the vehicle computer 110 can detect the user, e.g., returning to the vehicle 105, remaining in the vehicle 105 after expiration of a timer, etc., based on data from the sensors 115. For example, the vehicle computer 110 can monitor data from the sensors 115 to detect a user has moved into the field of view of the sensors.

Upon detecting the user at the future time, the vehicle computer 110 can actuate one or more sensors 115 to obtain challenge biometric data for the user, e.g., in substantially the same manner as discussed above regarding obtaining enrollment biometric data. As discussed above, the vehicle computer 110 can query the memory to identify the user data for the user. The vehicle computer 110 can then authorize the user based on the challenge biometric data. That is, the vehicle computer 110 can perform biometric authorization using the challenge biometric data and the user data. Authorizing the user means determining that the user has permission to access the vehicle 105; a failure to authorize occurs upon a determination that the user lacks permission to access the vehicle 105.

Biometric facial recognition is described herein as one non-limiting example of biometric authorization. Biometric facial recognition typically operates by calculating physiological characteristics of a human face and comparing the calculated physiological characteristics to stored physiological characteristics from the trained model. Physiological characteristics can include measures of facial features such as the distance between pupils, distance between corners of the mouth and length of nose, etc. These measures can be normalized by forming ratios of the measurements and stored as the trained model. At challenge time, an image of the human seeking access is acquired and processed to extract physiological characteristics which are then compared to stored physiological characteristics to determine a match. Other non-limiting examples of biometric authorization can include fingerprint recognition, eye recognition, voice recognition, etc.

Biometric authorization software can be executed on the vehicle computer 110 or the sensor 115 data, e.g., image data, can be uploaded to a remote server computer 140 that maintains a database of trained models for execution. An example of biometric authorization software is facial identification software, for example Face Tracker. Face Tracker is a facial recognition software library written in C++ and available on facetracker.net under the MIT software license.

Facial identification software can determine two sets of facial features corresponding to a challenge image and an enrollment image and determine ratios of distances between features. Facial identification software can determine a confidence score by determining a match value with previously determined facial identification features. A user status can be determined by comparing the confidence score to a first confidence threshold. The first confidence threshold can be determined empirically, e.g., based on testing that allows for determining a threshold that minimizes a number of incorrectly authorized users.

Facial features include locations on a facial image such as inner and outer corners of the eyes and corners of the mouth. For example, facial feature detection routines such as SURF in the Dlib image processing library can determine locations on a face corresponding to facial features such as the center of each eye and the center of a mouth. The facial identification software can compare the ratios based on the two sets of features and determine a match value. If the ratios between sets of features match, meaning that they have the same value within an empirically determined tolerance, the person in the challenge image is determined to be the same person as in the previously acquired enrollment image.

The match value can be determined by determining a mean squared difference between the two sets of ratios. Matching the ratios of distances can reduce the variance in facial feature measurements caused by differences due to differences in distances from the camera and differences in poses between the two images.

The confidence score can be determined by multiplying the match value by a scalar constant that maps the match value to the interval (0,1), with values close to 1 corresponding to a good match and values close to 0 corresponding to a poor match. The scalar constant can be determined empirically by acquiring and testing a plurality of enrollment and challenge images.

A confidence score greater than a first confidence threshold can indicate that the challenge biometric data is a good match for the enrollment biometric data, therefore the user status should be "authorized." A confidence score less than or equal to the first confidence threshold can indicate that the challenge biometric data did not match the enrollment biometric data, and therefore user status should be set to "not authorized." A confidence score less than or equal to the first confidence threshold can indicate problems with the challenge biometric data, e.g., an unauthorized user passed facial identification, or an authorized user failed facial identification.

Upon determining not to authorize the user based on the challenge biometric data, the vehicle computer 110 can control vehicle 105 locks to prevent the user from accessing the vehicle 105, e.g., the passenger cabin 200. Additionally, or alternatively, the vehicle computer 110 can prevent actuation of one or more vehicle components 125, e.g., so as to prevent operation of the vehicle 105 and/or adjustment of one or more vehicle 105 features. Additionally, the vehicle computer 110 can prevent the challenge biometric data from being stored in a buffer, i.e., a portion of a memory for temporary data storage. For example, the vehicle computer 110 may be programmed to delete the challenge biometric data (so that it is not stored in a buffer) upon determining that the user is not authorized. In this situation, the vehicle computer 110 can maintain the user data.

Additionally, upon authenticating the unauthorized user (as discussed below) the vehicle computer 110 may be programmed to provide updated instructions to the user to provide updated enrollment biometric data, i.e., re-initiate biometric enrollment. For example, the vehicle computer 110 can actuate the HMI 118 to output, e.g., via a display, speakers, etc., the updated instructions to the user. The updated instructions specify actions for the user to perform, e.g., to interact with, such as face and/or touch, a specified sensor, to adjust a user pose relative to a specified sensor, to remove accessories, such as hats, glasses, etc., to speak a word or phrase, etc., to allow the vehicle computer 110 to obtain the updated enrollment biometric data for the user.

Upon providing the updated instructions, the vehicle computer 110 can obtain the updated enrollment biometric data, e.g., in substantially the same manner as discussed above regarding obtaining the enrollment biometric data. The vehicle computer 110 can then update the user data to include the updated enrollment biometric data. For example, the vehicle computer 110 can update the look-up table to associate the user with the updated enrollment biometric data.

Upon authorizing the user based on the challenge biometric data, the vehicle computer 110 can control the vehicle 105 based on the user data for the user, e.g., the user authorization, as discussed above. Additionally, the vehicle computer 110 is programmed to determine whether to update the user data based on determining whether a trigger has occurred. The vehicle computer 110 can initiate a first timer upon authorizing the user based on the challenge biometric data. A duration of the first timer may be a predetermined amount of time, e.g., determined empirically based on testing that allows for determining an average amount of time for various triggers to occur. The duration of the first timer may be stored, e.g., in a memory of the vehicle computer 110. If the vehicle computer 110 determines a trigger has occurred prior to expiration of the first timer, then the vehicle computer 110 determines to update the user data (as discussed below). If the vehicle computer 110 determines a trigger has not occurred prior to expiration of the first timer, then the vehicle computer 110 determines not to update the user data. In this situation, the vehicle computer 110 can maintain the user data and prevent the challenge biometric data from being stored in the buffer. For example, the vehicle computer 110 may be programmed to delete the challenge biometric data upon determining to not update the user data.

For purposes of this document, a "trigger" is a specific condition that can be true or false at a given time. For example, a trigger may be an expiration of a second timer. A duration of the second timer is a predetermined time, e.g., based on testing that allows for determining an amount of time after which biometric data for a user can change, e.g., based on age, weight, etc. The duration of the second timer may be stored, e.g., in a memory of the vehicle computer 110. The vehicle computer 110 can initiate the second timer upon generating the user data. Upon expiration of the second timer, the vehicle computer 110 can reset and initiate the second timer. If the second timer has expired, then the vehicle computer 110 determines no trigger has occurred. If the second timer has not expired, then the vehicle computer 110 determines a trigger has occurred.

As another example, the vehicle computer 110 can determine a trigger based on comparing the confidence score for the challenge biometric data to a second confidence threshold. The second confidence threshold is greater than the first confidence threshold. If the confidence score for the challenge biometric data exceeds the second confidence threshold, then the vehicle computer 110 determines no trigger has occurred. If the confidence score for the challenge biometric data is less than or equal to the second confidence threshold, then the vehicle computer 110 determines a trigger has occurred.

As yet another example, the vehicle computer 110 can determine a trigger based on detecting a presence of a variable characteristic for the user. As used herein, a "variable characteristic" is a physical object that can be placed on the user and is capable of altering the user's appearance. Non-limiting examples of variable characteristics include hats, glasses, scarves, masks, hoods, etc. The vehicle computer 110 can receive and analyze sensor 115 data to detect a presence of a variable characteristic for the user, e.g., using known image processing techniques. If the vehicle computer 110 detects a variable characteristic, then the vehicle computer 110 determines a trigger has occurred. If the vehicle computer 110 does not detect a variable characteristic, then the vehicle computer 110 determines that no trigger has occurred.

As yet another example, the vehicle computer 110 can determine a trigger based on a confidence score trend. For example, the vehicle computer 110 can store confidence scores for respective challenge biometric data. The vehicle computer 110 can analyze the stored confidence scores, e.g., using known data processing techniques, to determine the confidence score trend, i.e., a change in the stored confidence scores over time. The vehicle computer 110 can then compare the confidence score trend to a trend threshold. The trend threshold may be stored, e.g., in a memory of the vehicle computer 110. The trend threshold may specify a maximum rate of change above which the vehicle computer 110 determines a trigger has occurred. The trend threshold may be determined empirically, e.g., based on testing that allows for determining various changes in confidence scores over various amounts of time that indicate a decrease in the accuracy of the biometric authorization for various users. If the confidence score trend is greater than or equal to the trend threshold, then the vehicle computer 110 can determine a trigger has occurred. If the confidence score trend is less than the trend threshold, then the vehicle computer 110 can determine that no trigger has occurred.

Upon determining a trigger has occurred, the vehicle computer 110 can store the challenge biometric data in the buffer. Prior to storing the challenge biometric data, the vehicle computer can encrypt the challenge biometric data. For example, the vehicle computer 110 may input the challenge biometric data into a cryptographic program that encrypts the challenge biometric data based on a key.

For example, the vehicle computer 110 can input the challenge biometric data and the key into a permutation program. The permutation program (sometimes called a permutation generator) can be a conventional cryptographic program, e.g., a program including an Advanced Encryption Standard (AES) algorithm. The permutation program can rearrange the data in the challenge biometric data in an order that is specified by the key. That is, the permutation program performs, for each portion of the challenge biometric data, one or more of a substitution, a change of order of segments in the message, or a mathematical operation according to block ciphers generated from the key. For example, if the permutation program is an AES algorithm, the vehicle computer 110 can identify a 16-bit portion of the challenge biometric data, apply an "exclusive-or" function (i.e., an XOR function) between the 16-bit portion and a portion of the key to generate a first round string, and arrange first round string into a 4×4 grid. Then, the vehicle computer 110 can perform one of (1) shift respective positions of bits within the rows of the 4×4 grid, (2) substitute one of the bits in the 4×4 grid with a known substitution bit, (3) shift respective positions of bits within the columns of the 4×4 grid, or (4) scaling values of the bits by predetermined integers. The shifting, scaling, and substitution algorithms are determined according to the specific permutation program. The vehicle computer 110 can execute the permutation program for the challenge biometric data to encrypt the challenge biometric data.

The vehicle computer 110 can retrieve the key, e.g., from the memory of the vehicle computer 110. The key is a predetermined set of alphanumeric characters. For example, the key can be a cryptographic key used in a conventional cryptographic program, e.g., Diffie-Hillman exchange, RSA encryption, AES, etc. The key can be specified, e.g., by a manufacturer of the vehicle computer 110. The vehicle computer 110 can receive the key from the remote server computer 140, e.g., via the network 135.

As another example, the encrypted challenge biometric data may be a hash. A "hash" is an output of a "hash" function that outputs a unique string of alphanumeric bits for a specific input. That is, while the hash appears random, only the specific input can produce the specific hash. In such an example, the vehicle computer 110 can input the challenge biometric data into a cryptographic hash function as Secure Hash Algorithm 1 (SHA-1), to generate the hash (i.e., an encrypted bit string of a fixed size).

Upon storing the challenge biometric data in the buffer, the vehicle computer 110 is programmed to initiate a third timer. A duration of the third timer may be a predetermined amount of time, e.g., determined empirically based on testing that allows for determining an average amount of time to authenticate the user (as discussed below). The duration of the third timer may be stored, e.g., in a memory of the vehicle computer 110.

If the vehicle computer 110 does not authenticate the user prior to expiration of the third timer, then the vehicle computer 110 deletes the challenge biometric data from the buffer and maintains the user data. Additionally, the vehicle computer 110 may be programmed to provide instructions to the user to re-initiate biometric enrollment, as discussed above. The vehicle computer 110 can then update the user data upon obtaining the updated enrollment biometric data, as discussed above.

If the vehicle computer 110 authenticates the user prior to expiration of the third timer, then the vehicle computer 110 updates the user data based on the challenge biometric data. For example, the vehicle computer 110 can update the look-up table to associate the user with the challenge biometric data. In this situation, the vehicle computer 110 can access the buffer and decrypt the challenge biometric data. For example, the vehicle computer 110 can rearrange the retrieved challenge biometric data to decrypt and recover the challenge biometric data by using the key. As another example, the retrieved challenge biometric data may be a hash, as discussed above. In such an example, the vehicle computer 110 can rearrange the hash to re-compute the challenge biometric data by using the hash function and the key. Upon updating the user data, the vehicle computer 110 can delete the challenge biometric data from the buffer. Additionally, or alternatively, the vehicle computer 110 can provide additional instructions to the user to provide biometric data in addition to the challenge data retrieved from the buffer, e.g., in substantially the same manner as discussed above regarding providing the updated instructions.

The vehicle computer 110 is programmed to authenticate the user based on an authenticator. Authenticating the user means validating or proving the identity of the user; a failure to authenticate occurs upon a determination that the user's identity cannot be validated, i.e., proved. As one example, the authenticator can be the second confidence threshold. In this situation, the vehicle computer 110 can authenticate the user based on comparing the confidence score for the challenge biometric data to the second confidence threshold. If the confidence score for the challenge biometric data exceeds the second confidence threshold, then the vehicle computer 110 authenticates the user. If the confidence score for the challenge biometric data is less than or equal to the second confidence threshold, then the vehicle computer 110 determines to not authenticate the user.

As another example, the authenticator may be an authorized portable device 145. In this situation, the vehicle computer 110 may authenticate the user based on detecting the authorized portable device 145 within a predetermined distance of the vehicle 105. For example, the vehicle computer 110 can detect a portable device 145 based on detecting the return of an RF signal, as discussed above. Additionally, the vehicle computer 110 can receive location data from the portable device 145, as discussed above. Upon detecting the portable device 145, the vehicle computer 110 can compare a distance between the portable device 145 and the vehicle computer 110 to the predetermined distance. The distance is a straight line distance between geo-coordinates specified by the location data of the portable device 145 and geo-coordinates specified by the geo-fence for the passenger cabin 200. The predetermined distance specifies a maximum distance from a vehicle 105 within which the vehicle computer 110 can identify a user. The predetermined distance may be determined empirically, e.g., based on testing that allows for determining a distance from the vehicle 105 that indicates the detected user is likely to seek access to the vehicle 105. The predetermined distance may be stored, e.g., in a memory of the vehicle computer 110.

If the distance is greater than the predetermined distance, then the vehicle computer 110 can ignore the detected portable device 145. In this situation, the vehicle computer 110 determines to not authenticate the user. If the distance is less than or equal to the predetermined distance, then the vehicle computer 110 can authorize the portable device 145. Upon authorizing the portable device 145, the vehicle computer 110 can be programmed to authenticate the user.

Authorizing the portable device 145 means the vehicle computer 110 determining that the portable device 145 has permission to communicate with the vehicle computer 110; a failure to authorize occurs upon a determination that the portable device 145 lacks permission to communicate with the vehicle computer 110. The vehicle computer 110 may, for example, be programmed to authorize the portable device 145 based on a key, e.g., a combination of numbers and/or characters, received from the portable device 145. For example, the vehicle computer 110 may authorize the portable device 145 based on determining the received key matches an expected key, e.g., known to certain parties such as vehicle 105 distributors, e.g., dealers, stored in the memory of the vehicle computer 110. As another example, the authorized portable device 145 can have an RFID tag or the like uniquely specifying the user from among other potential users who regularly use the vehicle 105. The RFID signal can be associated with the user in memory of the vehicle computer 110. As another example, the authorized portable device 145 can pair with, e.g., the HMI 118. The authorized portable device 145 can be associated with the user in memory.

As another example, the authenticator may be a user input specifying identifying information for the user, e.g., a username and a password. For example, the vehicle computer 110 can actuate the HMI 118 to display virtual buttons corresponding to alphanumeric characters that the user can select to provide the identifying information. In other words, the HMI 118 may activate sensors that can detect the user selecting virtual buttons to specify the user's identifying information. Upon detecting the user input, the HMI 118 can provide the user input to the vehicle computer 110, and the vehicle computer 110 can authenticate the user based on the user input. For example, the vehicle computer 110 can compare the identifying information specified by the user input to identifying information stored, e.g., in a memory of the vehicle computer 110. If the retrieved identifying information matches the stored identifying information, then the vehicle computer 110 determines to authenticate the user. In this context, "match" means retrieved identifying information identifies a same user as stored identifying information. If the retrieved identifying information does not match the stored identifying information, then the vehicle computer 110 determines to not authenticate the user.

As yet another example, the authenticator may be secondary challenge biometric data. Secondary challenge biometric data herein means a different type of biometric data than the challenge biometric data. Secondary challenge biometric data may be obtained after the challenge biometric data being obtained. For example, to authenticate the user, the vehicle computer 110 may actuate the HMI 118 to provide, e.g., via a display, speakers, etc., instructions for the user to provide the secondary challenge biometric data. As one non-limiting example, the challenge biometric data may include facial characteristics of the user, and the secondary challenge biometric data may include a fingerprint of the user.

The vehicle computer 110 may be programmed to biometrically authorize the user based on the secondary challenge biometric data. For example, the user data may include secondary enrollment biometric data that is a same type of biometric data as the secondary challenge biometric data. The vehicle computer 110 can determine a confidence score for the secondary challenge biometric data, e.g., in substantially the same manner as discussed above regarding determining a confidence score for the challenge biometric data, and can compare the confidence score for the secondary challenge biometric data to the first confidence threshold. If the confidence score for the secondary challenge biometric data exceeds the first confidence threshold, then the vehicle computer 110 can authenticate the user. If the confidence score for the secondary challenge biometric data is less than or equal to the first confidence threshold, then the vehicle computer 110 can determine to not authenticate the user.

In an example in which the vehicle computer 110 detects the trigger prior to authenticating the user, the vehicle computer 110 can be programmed to update the user data (as discussed above) upon authenticating the user. In an example in which the vehicle computer 110 authenticates the user prior to detecting the trigger, the vehicle computer 110 can obtain updated challenge biometric data for the user, e.g., in substantially the same manner as discussed above regarding obtaining the challenge biometric data.

The vehicle computer 110 can be programmed to biometrically authorize the user based on the updated challenge biometric data. That is, the vehicle computer 110 can perform biometric authorization using the updated challenge biometric data and the user data. The vehicle computer 110 can determine a confidence score for the updated challenge biometric data, e.g., as discussed above regarding determining a confidence score for the challenge biometric data. The vehicle computer 110 can then compare the confidence score for the updated challenge biometric data to the second confidence threshold. If the confidence score for the updated challenge biometric data exceeds the second confidence threshold, then the vehicle computer 110 can update the user data to include the updated challenge biometric data. In this situation, the vehicle computer 110 can control the vehicle 105 based on the updated user data for the user, as discussed above. If the confidence score for the updated challenge biometric data is less than or equal to the second confidence threshold, then the vehicle computer 110 can maintain the user data. In this situation, the vehicle computer 110 can provide instructions for the user to provide updated enrollment biometric data, as discussed above.

Figure 4A:
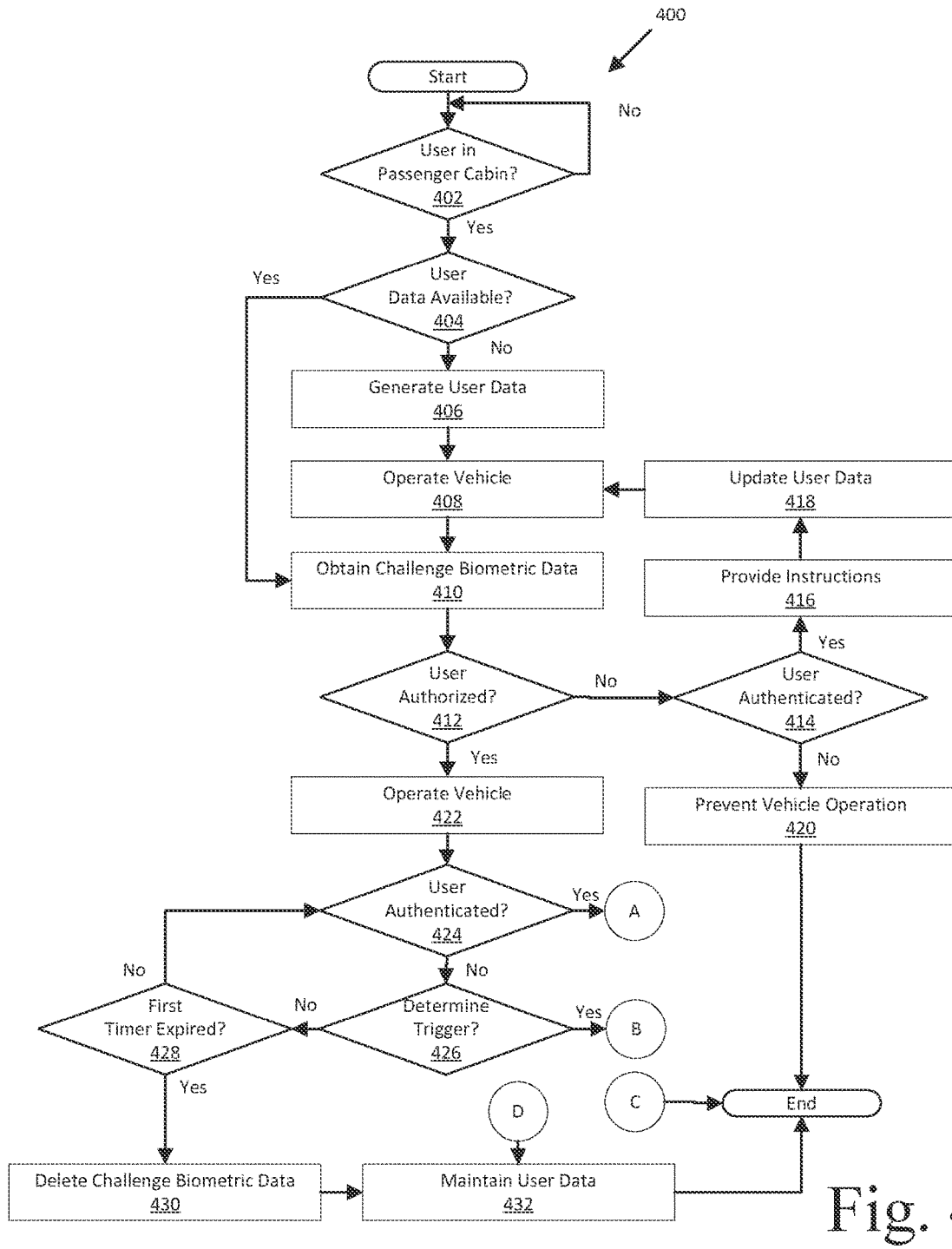
FIG. 4A is a first portion of a flowchart of an example process for updating user data to biometrically authorize a user.

FIG. 4A is a first portion of a flowchart of an example process 400 (other portions being shown in FIG. 4B because the entire flowchart will not fit on a single drawing sheet) executed in a vehicle computer 110 according to program instructions stored in a memory thereof for biometrically authorizing a user. Process 400 includes multiple blocks that can be executed in the illustrated order. Process 400 could alternatively or additionally include fewer blocks or can include the blocks executed in different orders.

Process 400 begins in a block 402. In the block 402, the vehicle computer 110 determines whether a user is in a passenger cabin 200 of the vehicle 105. The vehicle computer 110 can determine the user is in the passenger cabin 200 based on data from internal sensors 115b, as discussed above. If the vehicle computer 110 determines that the user is in the passenger cabin 200, then the process 400 continues in a block 404. Otherwise, the process 400 remains in the block 402.

In the block 404, the vehicle computer 110 determines whether user data of the user is available, e.g., stored in a memory of the vehicle computer 110, as discussed above. If user data of the user is available, then the process 400 continues in a block 410. Otherwise, the process 400 continues in a block 406.

In the block 406, the vehicle computer 110 generates user data for the user. The vehicle computer 110 can actuates one or more internal sensors 115b to obtain enrollment biometric data for the user, as discussed above. The vehicle computer 110 then associates the enrollment biometric data with the user, as discussed above. Additionally, the vehicle computer 110 can determine a user authorization based on detecting, via an HMI 118, a user input specifying the user authorization, as discussed above. The vehicle computer 110 can then associate the user authorization with the user. The process 400 continues in a block 408.

In the block 408, the vehicle computer 110 controls one or more vehicle components 125 based on the user data for the user, as discussed above. The process 400 continues in the block 410.

In the block 410, the vehicle computer 110 obtains challenge biometric data for the user. Upon detecting the user, e.g., approaching the vehicle 105 via data from external sensors 115a or in the passenger cabin 200 via data from the internal sensors 115b, the vehicle computer 110 can actuate one or more sensors 115 to obtain the challenge biometric data for the user, as discussed above. The process 400 continues in a block 412.

In the block 412, the vehicle computer 110 determines whether to authorize the user based on the challenge biometric data. The vehicle computer 110 performs biometric authorization for the user to determine a confidence score for the challenge biometric data, as discussed above. The vehicle computer 110 compares the confidence score for the challenge biometric data to a first confidence threshold, as discussed above. If the confidence score for the challenge biometric data exceeds the first confidence threshold, then the process 400 continues in a block 422. Otherwise, the process 400 continues in a block 414.

In the block 414, the vehicle computer 110 determines whether the user is authenticated. The vehicle computer 110 can authenticate the user based on detecting an authenticator, as discussed above. If the vehicle computer 110 authenticates the user, then the process 400 continues in a block 416. Otherwise, the process 400 continues in a block 420.

In the block 416, the vehicle computer 110 provides instructions to the user, as discussed above. The instructions specifying actions for the user to provide updated enrollment biometric data, as discussed above. The process 400 continues in a block 418.

In the block 418, the vehicle computer 110 updates the user data to include the updated enrollment biometric data, as discussed above. The process 400 continues returns to the block 408.

In the block 420, the vehicle computer 110 prevents the user from controlling and/or accessing the vehicle 105, as discussed above. The process 400 ends following the block 420.

In the block 422, the vehicle computer 110 controls one or more vehicle components 125 based on the user data for the user, as discussed above. The process 400 continues in the block 424.

In the block 424, the vehicle computer 110 determines whether the user is authenticated. The block 424 is substantially identical to the block 414 of the process 400 therefore will not be described further to avoid redundancy. If the vehicle computer 110 authenticates the user, then the process 400 continues in a block 434. Otherwise, the process 400 continues in a block 426.

In the block 426, the vehicle computer 110 determines whether a trigger has occurred, as discussed above. As set forth above, a trigger indicates that user data for the user requires updated biometric data for the user. If the vehicle computer 110 determines that a trigger has occurred, then the process 400 continues in a block 442. Otherwise, the process 400 continues in a block 428.

In the block 428, the vehicle computer 110 determines whether a first timer has expired. As set forth above, the vehicle computer 110 can initiate the first timer upon authorizing the user based on the challenge data. If the first timer has expired, then the process 400 continues in a block 430. Otherwise, the process 400 returns to the block 424.

In the block 430, the vehicle computer 110 deletes the challenge biometric data. That is, the vehicle computer prevents the challenge biometric data from being stored in a buffer. The process 400 continues in a block 432.

In the block 432, the vehicle computer 110 maintains the user data. That is, the vehicle computer 110 continues to operate the vehicle 105 based on the user data. The vehicle computer 110 may provide instructions to the user to provide updated enrollment biometric data, as discussed above. The process 400 ends following the block 432.

Figure 4B:
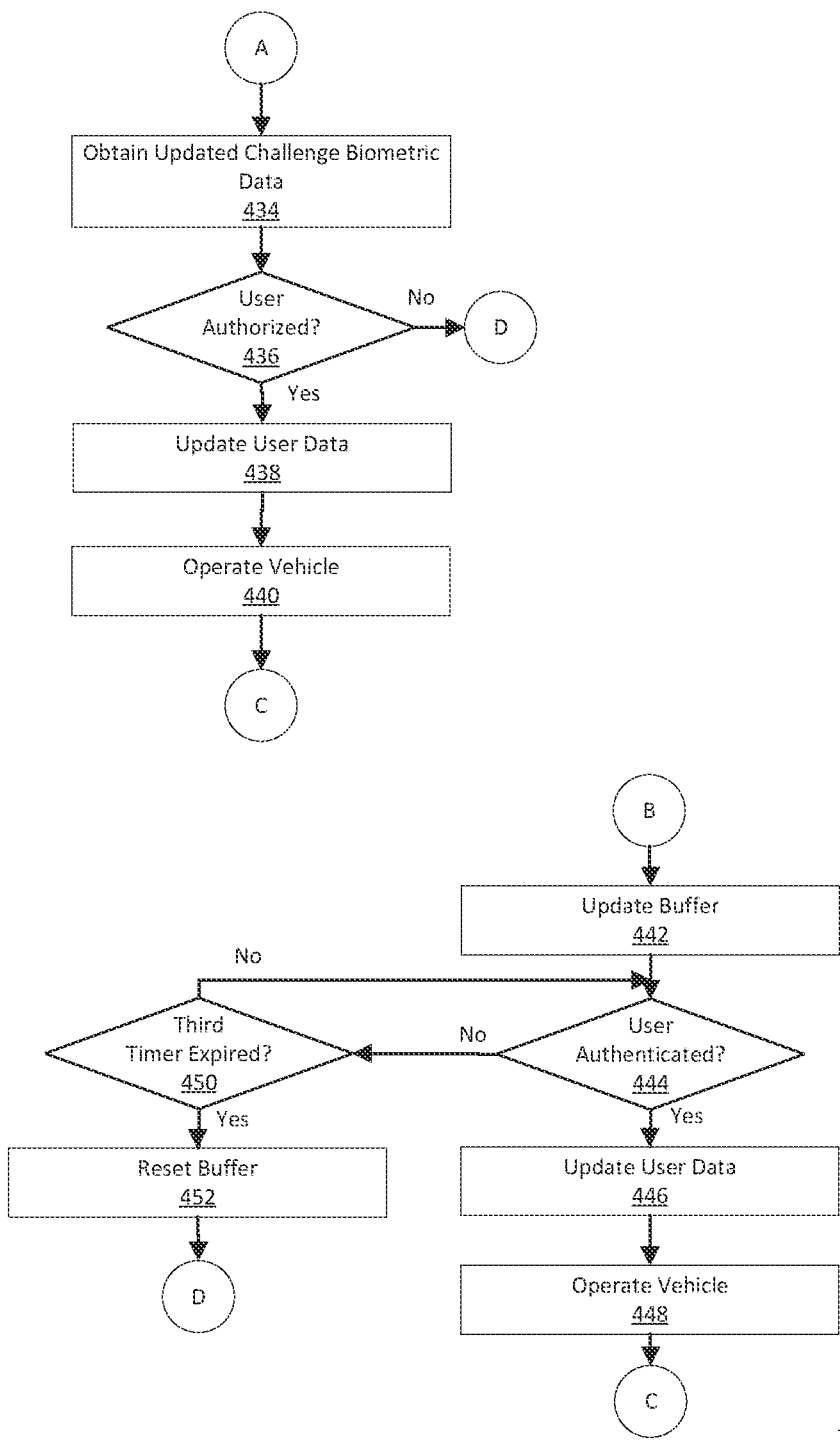
FIG. 4B is a second portion of the flowchart of FIG. 4A.

Turning now to FIG. 4B, following the block 424 shown in FIG. 4A, in the block 434, the vehicle computer 110 obtains updated challenge biometric data for the user. The block 434 is substantially identical to the block 410 of the process 400 therefore will not be described further to avoid redundancy. The process 400 continues in a block 436.

In the block 436, the vehicle computer 110 determines whether to authorize the user based on the updated challenge biometric data. The vehicle computer 110 performs biometric authorization for the user to determine a confidence score for the updated challenge biometric data, as discussed above. The vehicle computer 110 compares the confidence score for the updated challenge biometric data to a second confidence threshold, as discussed above. If the confidence score for the updated challenge biometric data exceeds the second confidence threshold, then the process 400 continues in a block 438. Otherwise, the process 400 continues in the block 432.

In the block 438, the vehicle computer 110 updates the user data to include the updated challenge biometric data, as discussed above. The process 400 continues in a block 440.

In the block 440, the vehicle computer 110 controls one or more vehicle components 125 based on the updated user data for the user, as discussed above. The process 400 ends following the block 440.

In the block 442, the vehicle computer 110 stores the challenge biometric data to a buffer, as discussed above. The process 400 continues in a block 444.

In the block 444, the vehicle computer 110 determines whether the user is authenticated. The block 434 is substantially identical to the block 414 of the process 400 therefore will not be described further to avoid redundancy. If the vehicle computer 110 authenticates the user, then the process 400 continues in a block 446. Otherwise, the process 400 continues in a block 450.

In the block 446, the vehicle computer 110 updates the user data to include the challenge biometric data, as discussed above. The process 400 continues in a block 448.

In the block 448, the vehicle computer 110 controls one or more vehicle components 125 based on the updated user data for the user, as discussed above. The process 400 ends following the block 448.

In the block 450, the vehicle computer 110 determines whether a third timer has expired. As set forth above, the vehicle computer 110 can initiate the third timer upon storing the challenge biometric data to the buffer. If the third timer has not expired, then the process 400 returns to the block 444. If the third timer has expired, then the process 400 continues in a block 452.

In the block 452, the vehicle computer 110 resets the buffer. That is, the vehicle computer 110 deletes the challenge biometric data from the buffer. The process 400 continues in the block 432.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the processor to:
   upon authorizing a user to access a structure, via challenge biometric data, determine to update user data based on determining a trigger;
   upon determining the trigger prior to authenticating an identity of the user, update the user data with the challenge biometric data based on authenticating the user;
   upon determining the trigger after authenticating the user, update the user data with updated challenge biometric data based on a confidence score for the updated challenge biometric data exceeding a threshold; and
   control one or more components of the structure based on the updated user data.

2. The system of claim 1, wherein the trigger includes one or more of expiration of a timer, a confidence score for the challenge biometric data being less than a second confidence threshold, or a presence of a variable characteristic for the user.

3. The system of claim 1, wherein the instructions further include instructions to:
   based on a confidence score for the challenge biometric data exceeding the threshold, store the challenge biometric data in a buffer upon detecting the trigger; and
   upon updating the user data with the challenge biometric data, delete the challenge biometric data from the buffer.

4. The system of claim 3, wherein the instructions further include instructions to delete the challenge biometric data from the buffer based on not authenticating the user within a predetermined time of storing the challenge biometric data in the buffer.

5. The system of claim 3, wherein the instructions further include instructions to, based on determining to not update the user data, prevent storage of the challenge biometric data in the buffer.

6. The system of claim 3, wherein the instructions further include instructions to, based on the confidence score for the challenge biometric data not exceeding the threshold, prevent storage of the challenge biometric data in the buffer.

7. The system of claim 3, wherein the instructions further include instructions to encrypt the challenge biometric data prior to storing the challenge biometric data in the buffer.

8. The system of claim 7, wherein the instructions further include instructions to:
upon determining to update the user data based on the challenge biometric data, retrieve the encrypted challenge biometric data from the buffer; and
decrypt the challenge biometric data prior to updating the user data.

9. The system of claim 1, wherein the instructions further include instructions to authorize the user based on determining that a confidence score for the challenge biometric data is greater than the threshold.

10. The system of claim 9, wherein the instructions further include instructions to authenticate the user based on determining that the confidence score for the challenge biometric data is greater than a second confidence threshold, the second confidence threshold being greater than the threshold.

11. The system of claim 1, wherein the instructions further include instructions to authenticate the user based on secondary challenge biometric data, the secondary challenge biometric data being a different type of biometric data than the challenge biometric data.

12. The system of claim 1, wherein the instructions further include instructions to authenticate based on a user input.

13. The system of claim 1, wherein the instructions further include instructions to authenticate based on detecting an authorized device.

14. The system of claim 1, wherein the instructions further include instructions to update the user data based additionally on a user input.

15. The system of claim 1, wherein the instructions further include instructions to:
based on a confidence score for the challenge biometric data not exceeding the threshold, provide instructions for the user to provide updated biometric data; and
upon obtaining the updated biometric data, update the user data with the updated biometric data.

16. A method, comprising:
upon authorizing a user to access to access a structure, via challenge biometric data, determining to update user data based on determining a trigger;
upon determining the trigger prior to authenticating the user, updating the user data with the challenge biometric data based on authenticating the user;
upon determining the trigger after authenticating an identity of the user, updating the user data with updated challenge biometric data based on a confidence score for the updated challenge biometric data exceeding a threshold; and
controlling one or more components of the structure based on the updated user data.

17. The method of claim 16, wherein the trigger includes one or more of expiration of a timer, a confidence score for the challenge biometric data being less than a second confidence threshold, or a presence of a variable characteristic for the user.

18. The method of claim 16, further comprising:
based on a confidence score for the challenge biometric data exceeding the threshold, storing the first biometric data in a buffer upon detecting the trigger; and
upon updating the user data with the challenge biometric data, deleting the challenge biometric data from the buffer.

19. The method of claim 18, further comprising deleting the challenge biometric data from the buffer based on not authenticating the user within a predetermined time of storing the challenge biometric data in the buffer.

20. The method of claim 16, further comprising authorizing the user based on determining that a confidence score for the challenge biometric data is greater than the threshold.

* * * * *